United States Patent
French et al.

(10) Patent No.: US 9,191,775 B2
(45) Date of Patent: Nov. 17, 2015

(54) ELECTRONICALLY BINDING TO A LOST MOBILE DEVICE

(71) Applicant: International Business Machines Corporation, Armonk, NY (US)

(72) Inventors: Paul B. French, Dublin Pike (IE); Jack J. Healy, Carrigaline (IE); Niall J. Lucey, Carrigadrohid (IE)

(73) Assignee: International Business Machines Corporation, Armonk, NY (US)

(*) Notice: Subject to any disclaimer, the term of this patent is extended or adjusted under 35 U.S.C. 154(b) by 26 days.

(21) Appl. No.: 14/133,770

(22) Filed: Dec. 19, 2013

(65) Prior Publication Data
US 2015/0181370 A1    Jun. 25, 2015

(51) Int. Cl.
H04W 24/00 (2009.01)
H04W 4/02 (2009.01)

(52) U.S. Cl.
CPC ..................................... *H04W 4/02* (2013.01)

(58) Field of Classification Search
CPC ....... G06Q 20/32; H04W 4/008; H04W 4/02; H04W 12/06; H04W 12/12; H04W 12/08; H04W 88/02; H04W 4/021; H04W 4/025; H04W 64/00; H04W 64/003; H04W 8/24; H04L 12/2825; H04L 63/0428; H04L 2209/80; G06F 21/31; G06F 21/554; G06F 21/88

See application file for complete search history.

(56) References Cited

U.S. PATENT DOCUMENTS

| | | |
|---|---|---|
| 6,662,023 B1 | 12/2003 | Helle |
| 8,402,134 B1 | 3/2013 | Hir |
| 2005/0285731 A1 | 12/2005 | Outlaw et al. |
| 2008/0214111 A1 | 9/2008 | Moshir et al. |
| 2010/0173615 A1 | 7/2010 | Harris |
| 2010/0315236 A1 | 12/2010 | Sakargayan |
| 2012/0258728 A1 | 10/2012 | Seal et al. |
| 2013/0326642 A1* | 12/2013 | Hajj et al. ................ 726/34 |
| 2013/0326643 A1* | 12/2013 | Pai et al. ................. 726/35 |
| 2014/0162701 A1* | 6/2014 | Jellinek et al. ........... 455/456.6 |
| 2014/0273921 A1* | 9/2014 | Li et al. .................... 455/405 |
| 2014/0329460 A1* | 11/2014 | Loutit ...................... 455/39 |

FOREIGN PATENT DOCUMENTS

| | | |
|---|---|---|
| EP | 2053573 A1 | 4/2009 |
| KR | 1020080052099 A | 6/2008 |
| WO | 2007069263 A2 | 6/2007 |
| WO | 2010099376 A2 | 9/2010 |

OTHER PUBLICATIONS

Intellectual Property Search Report of Apr. 29, 2015 for Application No. GB1420692.4.

Disclosed Anonymously, "System and method of finding a lost/stolen mobile device which is not accessible by the owner", An IP.com Prior Art Database Technical Disclosure, IP.com No. IPCOM000223683D, Nov. 23, 2012, website: <http://ip.com/IPCOM/000223683>.

\* cited by examiner

*Primary Examiner* — Ajit Patel
(74) *Attorney, Agent, or Firm* — Nicholas L. Cadmus (57) ABSTRACT

A first mobile device detects a second mobile device in the vicinity of the first mobile device and determines that the second mobile device is lost. The first mobile device electronically binds to the second mobile device and obtains information relating to the second mobile device. The first mobile device sends the information relating to the second mobile device to a designated party. The first mobile device receives an indication that the second device is no longer lost. The first mobile device, in response to receiving the indication that the second device is no longer lost, unbinds from the second mobile device.

20 Claims, 4 Drawing Sheets

ELECTRONICALLY BINDING TO A LOST MOBILE DEVICE

TECHNICAL FIELD

The present invention relates generally to mobile devices and more specifically to a mobile device electronically binding itself to a lost mobile device.

BACKGROUND

Mobile electronic devices are an integral part of modern life. Notebooks, netbooks, tablet computers, smart phones and other portable devices comprise more than half of all computers produced worldwide. People use them to communicate, work, relax, and study. The memory in these devices store large amounts of personal data such as contacts, photographs, videos, authorization information, and much more. Corporate computers also contain official correspondence and documentation, which may include trade secrets.

These mobile electronic devices are often targets for theft or robbery. Criminals can have various objectives: to gain access to a computer's hard drive, to sell the computer, or, rarely, to use it themselves. Portable devices are easily lost due to their size and the fact that they are constantly moved around by the user.

SUMMARY

Aspects of an embodiment of the present invention disclose a method, computer program product, and computing system. The method includes a first mobile device detecting a second mobile device in the vicinity of the first mobile device and the first mobile device determining that the second mobile device is lost. The method further includes the first mobile device electronically binding to the second mobile device and obtaining information relating to the second mobile device. The method further includes the first mobile device sending the information relating to the second mobile device to a designated party. The method further includes the first mobile device receiving an indication that the second device is no longer lost. The method further includes the first mobile device, in response to receiving the indication that the second device is no longer lost, unbinding from the second mobile device.

DETAILED DESCRIPTION

Mobile devices or smart phones have become an essential part of our lives. Their use has gone beyond just making phone calls or texting. Nowadays, these smart phones are all-in-one communications, entertainment, social media and networking devices. They also contain a lot of information about us, much of it private. (e.g., contacts, likes/dislikes, notes, ideas, etc.)

The present invention involves other nearby mobile devices to solve the "lost device" problem. A nearby "good Samaritan" phone or mobile device electronically binds itself to a lost device in its vicinity. This can last until such time that the owner of the lost device or other responsible entity (e.g. a mobile operator) accepts responsibility or control over the lost device.

The advantages of this are that the probability of finding a lost device is increased because other mobile devices can now be actively involved. The lost device could, for example, send a message directly to the mobile operator's system but utilizing nearby devices provides for a speedier and more efficient recovery mechanism and an extra protection mechanism.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. A detailed description of cloud computing is given in this section to provide a better understanding of the underlying teachings discussed herein.

The present invention will now be described in detail with reference to the Figures.

Figure 1:
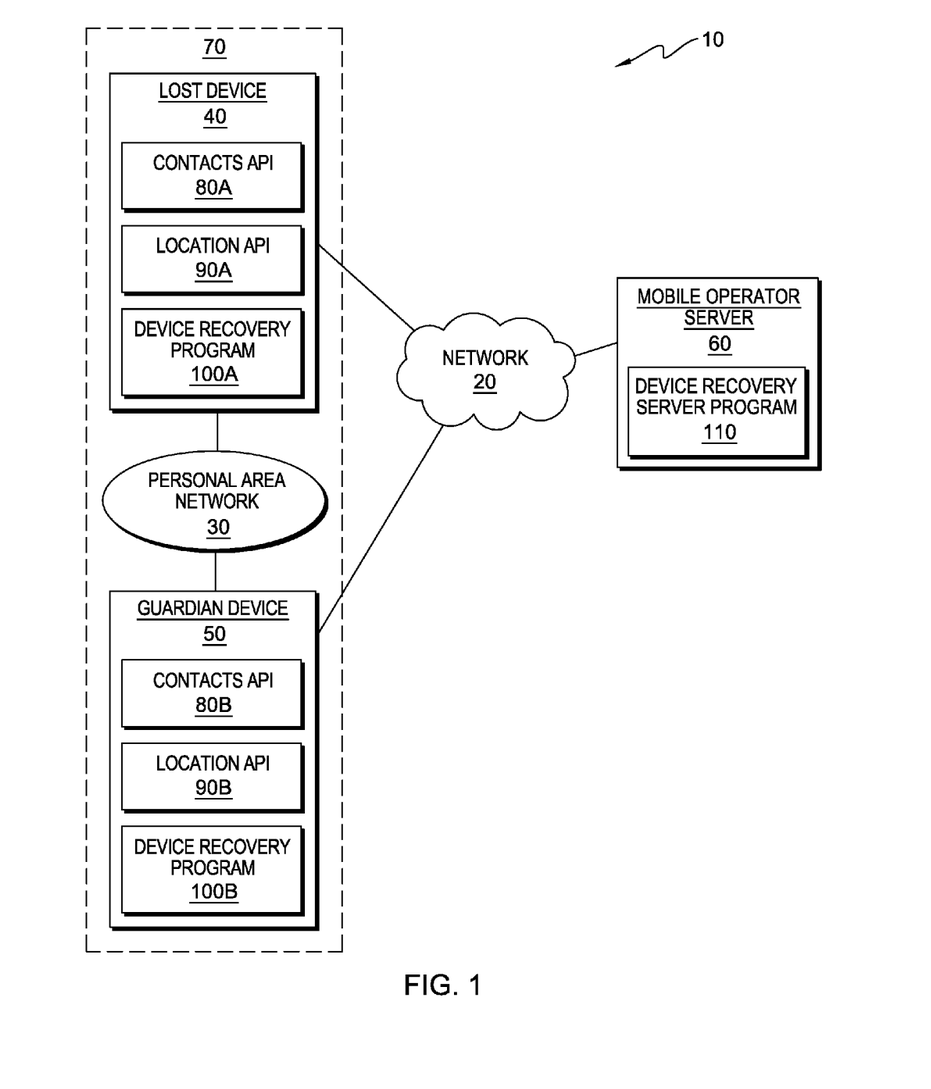
FIG. 1 depicts a diagram of a computing environment in accordance with one embodiment of the present invention.

FIG. 1 depicts a diagram of computing environment 10 in accordance with one embodiment of the present invention. FIG. 1 provides only an illustration of one embodiment and does not imply any limitations with regard to the environments in which different embodiments may be implemented.

In the depicted embodiment, computing environment 10 includes lost device 40, guardian device 50, and mobile operator server 60, interconnected over network 20. Network 20 may be a local area network (LAN), a wide area network (WAN) such as the Internet, the public switched telephone network (PSTN), a mobile data network (e.g., wireless internet provided by a third or fourth generation of mobile phone mobile communication), a private branch exchange (PBX), any combination thereof, or any combination of connections and protocols that will support communications between lost device 40, guardian device 50, and mobile operator server 60 in accordance with embodiments of the invention. Network 20 may include wired, wireless, or fiber optic connections. Computing environment 10 may include additional computing devices, servers, or other devices not shown.

Lost device 40 is a smart phone. In other embodiments, lost device 40 may be a laptop computer, tablet computer, or personal digital assistant (PDA). In general, lost device 40 may be any mobile electronic device or mobile computing system capable of sending and receiving data, and communicating with guardian device 50 and mobile operator server 60 over network 20. Lost device 40 contains contacts Application Programming Interface (API) 80A, location Application Programming Interface (API) 90A, and device recovery program 100A.

Guardian device 50 is a smart phone. In other embodiments, guardian device 50 may be a laptop computer, tablet computer, or personal digital assistant (PDA). In general, guardian device 50 may be any mobile electronic device or mobile computing system capable of sending and receiving data, and communicating with lost device 40 and mobile operator server 60 over network 20. Guardian device 50 contains contacts Application Programming Interface (API) 80B, location Application Programming Interface (API) 90B, and device recovery program 100B.

Lost device 40 and guardian device 50 are at location 70. Location 70 is an area where lost device 40 and guardian device 50 may communicate over personal area network 30. Personal area network (PAN) 30 may be a computer network with a small geographic scope. Computer networks with a small geographic scope range from Near Field Communication (NFC) to Local Area Networks (LANs). A computer network with a small geographic scope typically does not have a connection to the Internet or other remote networks. Personal area network (PAN) can be used for communication among mobile devices themselves (intrapersonal communication), or for connecting to a higher level network (e.g., the Internet). A wireless personal area network (WPAN) is a PAN carried over wireless network technologies such as Bluetooth® or peer-to-peer communications over a wireless LAN (Bluetooth is a registered trademark of Bluetooth SIG, Inc.). In embodiments of the present invention, lost device 40 and guardian device 50 each have the necessary hardware to allow for communication over whatever PAN is used for communication between them (e.g., a Bluetooth radio).

Mobile operator server 60 is a server computer. In other embodiments, mobile operator server 60 may be a management server, a web server, or any other electronic device capable of receiving and sending data. In another embodiment, mobile operator server 60 may represent a server computing system utilizing multiple computers as a server system, such as in a cloud computing environment. Mobile operator server 60 contains device recovery server program 110.

Figure 4:
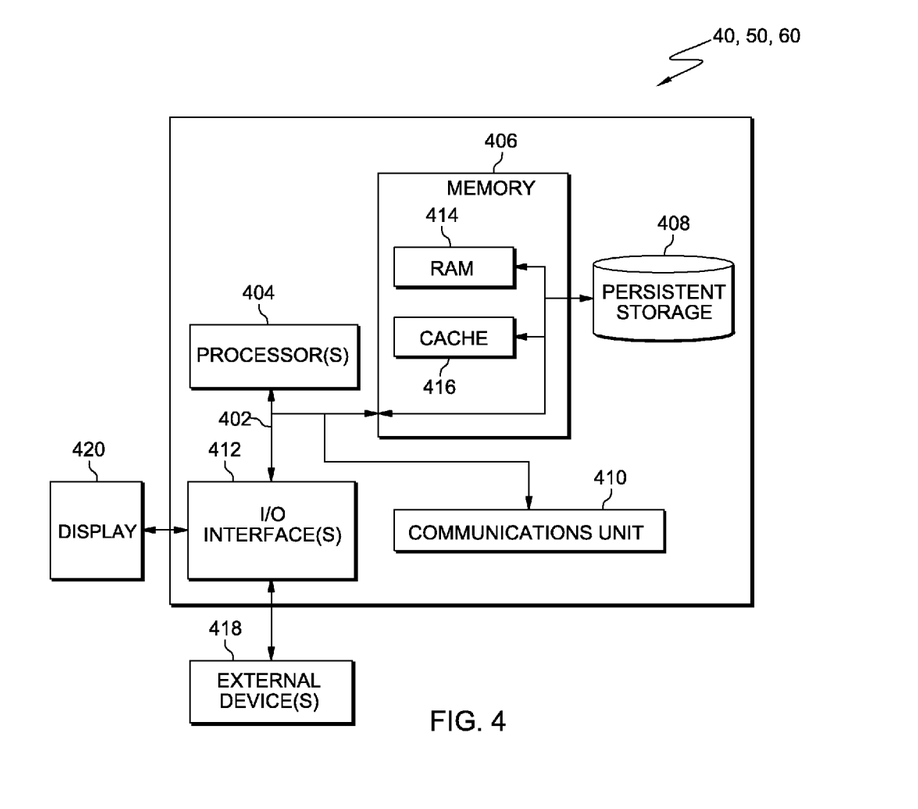
FIG. 4 depicts a block diagram of components of the lost device, the guardian device, and the mobile operator server of FIG. 1 in accordance with one embodiment of the present invention.

Lost device 40, guardian device 50, and mobile operator server 60 may each include components as depicted in further detail with respect to FIG. 4.

Contacts API's 80A and 80B are application programming interfaces that programs can call to retrieve contacts stored on lost device 40 and guardian device 50, respectively. In one embodiment, contacts are stored in a repository on lost device 40 and guardian device 50. The repository contains stored contacts and includes information associated with each contact. The information associated with each contact may include, but is not limited to, the name of a contact, telephone number of the contact, the email address of the contact, and any other information about the contact. In one embodiment, the repository is a repository that may be accessed through contacts API's 80A and 80B. In other embodiments, the repository may be a database such as an Oracle® database or an IBM® DB2® database.

Location API's 90A and 90B are application programming interfaces that programs can call to receive the location of lost device 40 and guardian device 50, respectively. Location API's are application programming interfaces that programs can call to receive the geographic location of a device. The location API receives the geographic location of a device from a Global Positioning System (GPS) receiver (not shown). A GPS receiver is integrated or connected to lost device 40 and/or guardian device 50. A GPS receiver can determine its geographic location and present that geographic location as longitude and latitude coordinates.

In another embodiment, the geographic location of lost device 40 and/or guardian device 50 may be determined by a mobile operator and sent to lost device 40 and/or guardian device 50 to be made available by accessing location API's (e.g., location API's 90A or 90B). A mobile operator may be a cellular telephone carrier if lost device 40 and/or guardian device 50 is a cellular telephone (e.g., smart phone). Cellular networks can determine the geographic location of a cellular telephone by using the radio resource location services protocol. Radio resource location services protocol supports the positioning method, Enhanced Observed Time Difference (E-OTD). E-OTD is based on measurements inside the cellular telephone, where the phone measures the observed time difference of arrival of bursts sent by nearby pairs of base transceiver stations.

Device recovery programs 100A and 100B operate generally to electronically bind guardian devices and lost devices that are near each other (e.g., able to communicate over a personal area network). Device recovery programs 100A and 100B are different instances of the same application on different devices. Device recovery programs 100A and 100B function in different modes depending on the device they are operating on. For example, device recovery program 100A is operating on lost device 40; therefore device recovery program 100A will function in a lost device mode as discussed in further detail with respect to FIG. 2. Device recovery program 100B is operating on guardian device 50; therefore device recovery program 100B will function in a guardian device mode as discussed in further detail with respect to FIG. 3.

Device recovery server program 110 operates generally to provide support functions for device recovery programs 100A and 100B. A support function may include receiving, forwarding, and managing telephone calls or electronic messages (e.g., text messages, email, etc.) between lost device 40, guardian device 50, and other devices (not shown). Another support function may include authentication of devices on a mobile operator's network. In other embodiments, the functionality of device recovery programs 100A and 100B may be done by device recovery server program 110.

An example of a generic scenario is as follows. Jim is cycling and his bike breaks down. Jim accepts a lift from a stranger who drops him in town. When Jim looks for his smart phone (e.g., lost device 40), he realizes he left it in the stranger's car. Jim has no way of finding his smart phone or contacting the stranger. Jim may have not activated his "find my iPhone®" application (or similar application on another device) or the stranger's car may be in an area with no wireless service. Meanwhile, Jim's smart phone is under a seat in the stranger's car. The stranger's smart phone (e.g., guardian device 50) is enabled with an instance of a device recovery program (e.g., device recovery program 100B). The stranger's smart phone detects Jim's smart phone in its vicinity and after finding Jim's smart phone to be lost (activated on Jim's smart phone after a configurable time or when it receives an 'activate lost phone' code from a text from Jim), electronically binds itself to Jim's smart phone. The stranger's smart phone retrieves Jim's email address and other details from Jim's smart phone and sends an email with a phone number of the stranger's smart phone and possibly other details (e.g., location). Jim receives the email, rings the stranger and the phone is returned. The stranger's smart phone unbinds from Jim's smart phone.

Figure 2:
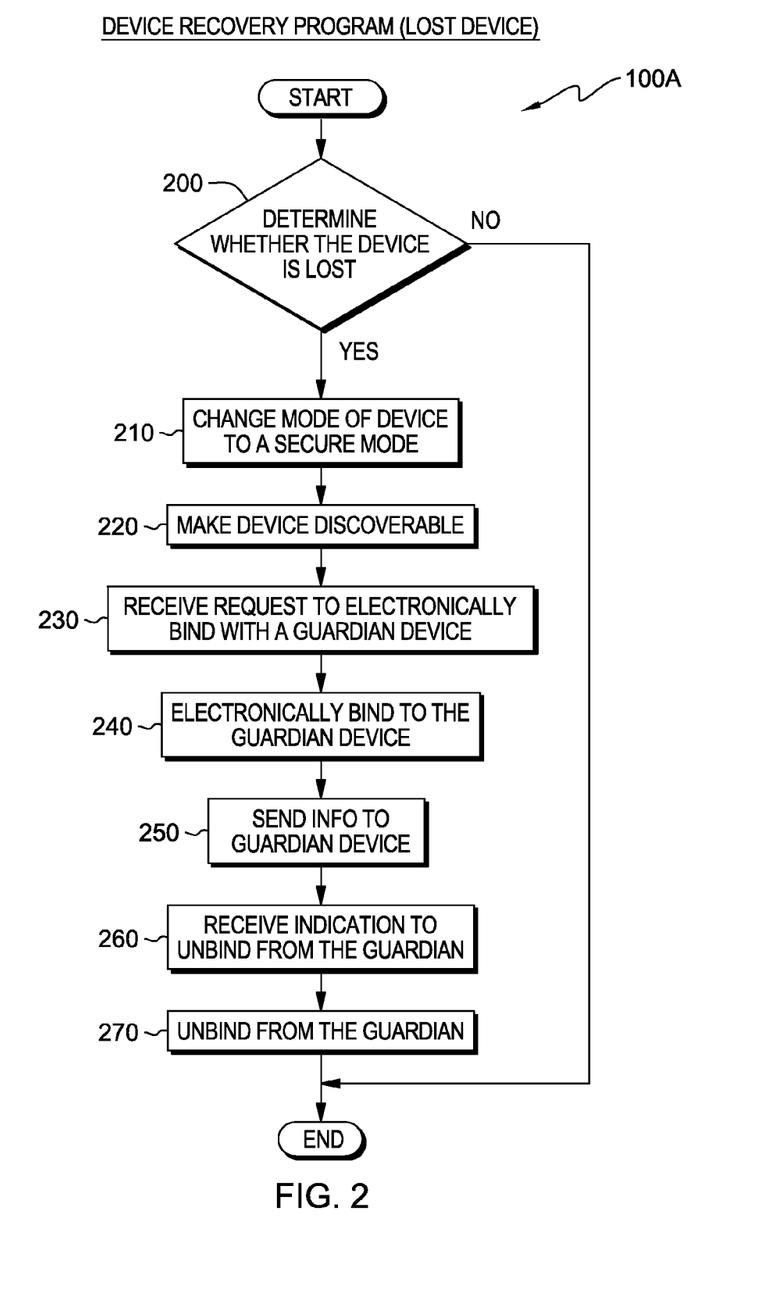
FIG. 2 depicts a flowchart of the steps of a device recovery program (in a lost device mode) executing within the computing environment of FIG. 1, for electronically binding guardian devices and lost devices that are near each other, in accordance with one embodiment of the present invention.

FIG. 2 depicts a flowchart of the steps of device recovery program 100A (in lost device mode) executing within the computing environment of FIG. 1, for electronically binding guardian devices and lost devices that are near each other, in accordance with one embodiment of the present invention.

Initially, a user of lost device 40 activates and configures device recovery program 100A. The user may configure how device recovery program 100A is to determine that lost device 40 is lost. The many embodiments of how device recovery program 100A may determine lost device 40 is lost will be discussed in reference to decision 200 below. In another embodiment, the user may also configure an optional secure mode for lost device 40 that may be entered in to when device recovery program 100A determines that lost device 40 is lost. The optional secure mode will be discussed in reference to step 210 below. Many other configurable settings will be discussed throughout the discussion of FIG. 2 and FIG. 3. After the user configures the settings of device recovery program 100A, as desired, device recovery program 100A will begin operation.

In decision 200, device recovery program 100A determines whether lost device 40 is lost. In one embodiment, device recovery program 100A monitors the usage of lost device 40 to determine if there has not been any outgoing network activity or user initiated activity such as outgoing text messages, telephone calls, or outgoing internet traffic within a particular time frame. Network activity can be monitored by accessing an API (not shown) that can provide network activity statistics of lost phone 40. For example, the time frame may be one hour, one day, one week, or any other time period. The time frame may begin at the activation of device recovery program 100A. The time frame and its beginning may be configurable by the user of lost device 40. If there has not been any outgoing network activity or user initiated activity within the particular time frame, device recovery program 100A determines that lost device 40 is lost.

In another embodiment, device recovery program 100A monitors the geographic location of lost device 40 to determine if lost device 40 is in an unusual geographic location. Device recovery program 100A calls location API 90A of lost device 40 for the geographic location of lost device 40. Location API 90A receives the geographic location of lost device 40 from a GPS receiver integrated with lost device 40. A GPS receiver can determine its geographic location and present that location as longitude and latitude coordinates. Device recovery program 100A compares the geographic location of lost phone 40 to a plurality of geographic locations previously stored on lost device 40. For example, the plurality of geographic locations previously stored on lost device 40 may have been entered manually by the user of lost device 40 at setup or automatically by software on lost device 40 that constantly monitored the geographic location of lost device 40 during normal operation. If the geographic location of lost device 40 retrieved by device recovery program 100A does not match any of the plurality of geographic locations previously stored on lost device 40, device recovery program 100A determines that lost device 40 is lost.

In yet another embodiment, device recovery program 100A monitors for the receipt of a text message from the user of lost device 40 operating another device or a text message from another known source. The text message must include a code to indicate to device recovery program 100A that lost device 40 is now lost. In one embodiment, the code may be a string of characters entered in the body of the text message received. The code may be preconfigured by the user of lost device 40 at setup. If a text message received contains the code to indicate that lost device 40 is now lost, device recovery program 100A determines that lost device 40 is lost.

In other circumstances, when a device is lost, that device might not have the function to say "I'm lost" or might not yet consider itself lost. The user of that device might engage one or more "good Samaritan" devices to be on the lookout for the lost device and report the lost device if/when it is encountered. Equally, before a device is lost, the user of that device might engage some "good Samaritan" devices to "keep a look out for" the device that may be more likely to be lost in the future. At some later time the user might ask the "good Samaritans" if/where they last encountered the now lost device. Additionally, the "good Samaritans", rather than each reporting their individual experience of the lost device in this regard, might confer and return a consolidated answer to the enquiring user. Further, the relationship of the "good Samaritans" to the lost (or to be lost) device might be authenticated with the mobile operator, and the "good Samaritan" devices might co-operate with the mobile operator in this regard such that when the user inquires, they ask the mobile operator before reporting the consolidated answer to the user (i.e. it may be that the mobile operator has better info in some cases).

If device recovery program 100A determines that lost device 40 is lost (decision 200, yes branch), device recovery program 100A proceeds to step 210. If device recovery program 100A determines that lost device 40 is not lost (decision 200, no branch), device recovery program 100A ends. In another embodiment, if device recovery program 100A determines that lost device 40 is not lost (decision 200, no branch), device recovery program 100A returns to decision 200.

In step 210, device recovery program 100A changes the mode of lost device 40 to a secure mode. In one embodiment, device recovery program 100A sends an indication to the operating system of lost phone 40 to activate its security features. The security features may include screen-locking which requires a personal identification number (PIN) or password to unlock, blocking access to stored data on lost phone 40, and/or restricting connectivity (Bluetooth, Universal Serial Bus, network). The restrictions relating to stored data and connectivity would not hinder function of device recovery program 100A.

In step 220, device recovery program 100A makes lost device 40 discoverable to guardian device 50. In one embodiment, device recovery program 100A activates the Bluetooth capabilities of lost device 40. For example, device recovery program 100A sends an indication, using a Bluetooth API of lost device 40, to activate the Bluetooth capabilities of lost device 40 and to put lost device 40 in to "discoverable mode." In other embodiments, device recovery program 100A causes lost device 40 to join any available personal area network such as personal area network 30. For example, if personal area network 30 is a WPAN (e.g., wireless LAN), device recovery program 100A sends an indication, using a wireless network API of lost device 40, to activate a wireless network antenna of lost device 40 and to join the available wireless network.

In step 230, device recovery program 100A receives a request for lost device 40 to electronically bind with guardian device 50 over PAN 30. In one embodiment, device recovery program 100A receives a request to "pair" lost device 40 with guardian device 50 from device recovery program 100B of guardian device 50 over PAN 30. In this embodiment, guardian device 50 must also be Bluetooth enabled and in "discoverable mode." In another embodiment, if lost device 40 and guardian device 50 are both within range to join the same WPAN (e.g., wireless LAN), device recovery program 100A receives a request to create a peer-to-peer connection from device recovery program 100B of guardian device 50.

In step 240, device recovery program 100A electronically binds lost device 40 with guardian device 50 over PAN 30. In one embodiment, device recovery program 100A "pairs" lost device 40 with guardian device 50 such that device recovery programs 100A and 100B can communicate using Bluetooth protocols. In this embodiment, "pairing" may occur using a known method of "pairing" that does not require user interaction with lost device 40, such as Secure Simple Pairing (SSP). Other methods of "pairing" may utilize the connections between lost device 40 and mobile operator server 60 and guardian device 50 and mobile operator server 60 to exchange authentication tokens or keys as needed.

In another embodiment, if lost device 40 and guardian device 50 are both within range to join the same WPAN (e.g., wireless LAN), device recovery program 100A accepts the request to create a peer-to-peer connection from device recovery program 100B of guardian device 50 such that device recovery programs 100A and 100B can communicate. In other embodiments, lost device 40 and guardian device 50 may be electronically bound such that device recovery programs 100A and 100B can communicate utilizing any known protocols or connections over a WPAN.

In step 250, device recovery program 100A sends information to guardian device 50. In one embodiment, device recovery program 100A receives a request from device recovery program 100B over PAN 30 for information relating to lost device 40. In response to receiving the request from device recovery program 100B, device recovery program 100A sends the information relating to lost device 40 to device recovery program 100B of PAN 30. In order for device recovery program 100A to respond to the request from device recovery program 100B, device recovery program 100A can call various APIs on lost device 40 to obtain the information relating to lost device 40. For example, device recovery program 100A can call contacts API 80A to retrieve the name and contact information of the user of lost device 40 including other contact numbers or email addresses. Device recovery program 100A can call location API 90A to determine where lost device 40 was lost during operation of step 200 described above.

In another embodiment, device recovery program 100A receives a request from device recovery server program 110 over network 20 for information relating to lost device 40. The mobile operator may use information previously configured by the user of lost device 40 while accessing device recovery server program 110 on the mobile operator's system instead of retrieving new information from lost phone 40, itself.

For example, information relating to lost device 40 may include, but is not limited to: the name and contact information of the user of lost device 40 including other contact numbers or email addresses; how long lost device 40 has been lost; where lost device 40 was lost; value of any reward offered for recovery of lost device 40 (this could be preset during the configuration of device recovery program 100A).

In step 260, device recovery program 100A receives an indication to unbind lost device 40 from guardian device 50. In one embodiment, after data is exchanged between device recovery programs 100A and 100B and lost device 40 is returned to its user, device recovery program 100A receives an indication from device recovery program 100B over PAN 30 indicating that lost device 40 is no longer lost. In another embodiment, device recovery program 100A must also receive an indication from the user that lost device 40 is no longer lost. For example, if the secure mode entered in to in step 210 includes screen locking, the entry of the required personal identification number or password to unlock the screen would also disable the lost device status. In other embodiments, device recovery program 100A may only have to receive an indication from the user that lost device 40 is no longer lost.

In step 270, after receiving the indication to unbind lost device 40 from guardian device 50, device recovery program 100A unbinds lost device 40 from guardian device 50. In one embodiment, if lost device 40 and guardian device 50 are "paired" such that device recovery programs 100A and 100B can communicate using Bluetooth protocols, device recovery program 100A removes guardian device 50 as a "paired" device. In another embodiment, if lost device 40 and guardian device 50 are both within range to join the same WPAN (e.g., wireless LAN) such that device recovery programs 100A and 100B can communicate, device recovery program 100A may send an indication, using a wireless network API of lost device 40, to deactivate the wireless network antenna of lost device 40 or to disconnect from the available wireless network.

Figure 3:
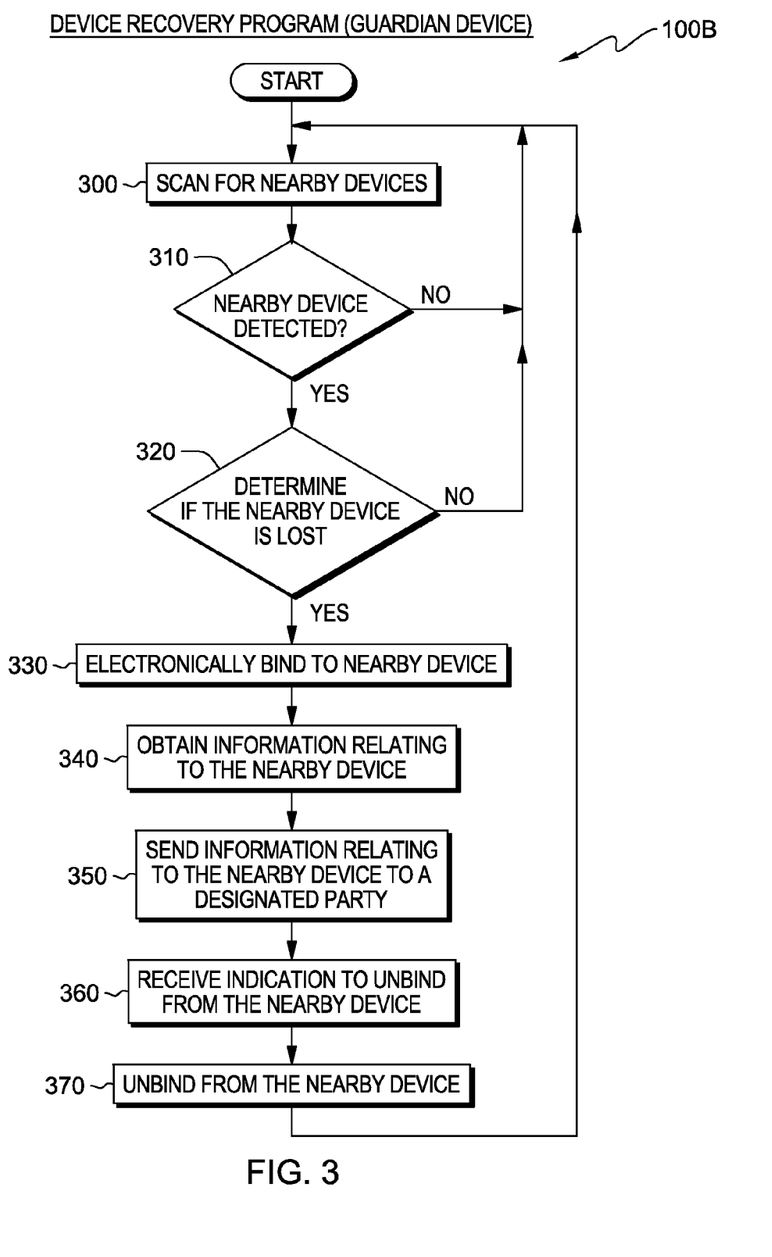
FIG. 3 depicts a flowchart of the steps of a device recovery program (in a guardian device mode) executing within the computing environment of FIG. 1, for electronically binding guardian devices and lost devices that are near each other, in accordance with one embodiment of the present invention.

FIG. 3 depicts a flowchart of the steps of device recovery program 100B (in guardian device mode) executing within the computing environment of FIG. 1, for electronically binding guardian devices and lost devices that are near each other, in accordance with one embodiment of the present invention.

Initially, a user of guardian device 50 activates and configures device recovery program 100B. The user may configure how device recovery program 100B is to operate when communicating with lost device 40 or any other device that is lost. After the user configures the settings of device recovery program 100B, as desired, device recovery program 100B will begin operation.

In step 300, device recovery program 100B scans for devices nearby guardian device 50. In one embodiment, device recovery program 100B makes guardian device 50 discoverable to lost device 40. In one embodiment, device recovery program 100B activates the Bluetooth capabilities of guardian device 50. For example, device recovery program 100B sends an indication, using a Bluetooth API of guardian device 50, to activate the Bluetooth capabilities of guardian device 50 and to put guardian device 50 in to "discoverable mode." Bluetooth devices that are set on "discoverable mode" have the ability to search for and locate each other, so long as they remain within range. In other embodiments, device recovery program 100B causes guardian device 50 to join any available personal area network such as personal area network 30. For example, if personal area network 30 is a WPAN (e.g., wireless LAN), device recovery program 100B sends an indication, using a wireless network API of guardian device 50, to activate a wireless network antenna of guardian device 50 and to join the available wireless network. In other embodiments, device recovery program 100A scans for devices nearby lost device 40.

In decision 310, device recovery program 100B determines if any devices nearby guardian device 50 have been detected. In one embodiment, device recovery program 100B sends an indication to the Bluetooth API of guardian device 50 to perform an inquiry to find other Bluetooth enabled devices to connect to. Any device in "discoverable mode" can be configured to respond to such inquiries. In another embodiment, once guardian device 50 joins the available wireless network, device recovery program 100B looks for other devices joined to the same network.

If device recovery program 100B determines that no devices nearby guardian device 50 have been detected (decision 310, no branch), device recovery program 100B returns to step 300. If device recovery program 100B determines that one or more devices nearby guardian device 50 have been detected (decision 310, yes branch, device recovery program 100B proceeds to decision 320.

In decision 320, device recovery program 100B determines if any of the one or more detected devices nearby guardian device 50 are lost. In one embodiment, device recovery program 100B sends an inquiry to device recovery program 100A on lost device 40 over PAN 30 to determine whether lost device 40 is lost. If device recovery program 100A on lost device 40 has determined that lost device 40 is lost, as described in reference to decision 200 above, device recovery program 100A will respond to the inquiry from device recovery program 100B and the response will indicate that lost device 40 is lost.

In another embodiment, if lost device 40 is lost but does not have the function to say "I'm lost" or might not yet consider itself lost, the user of lost device 40 may engage one or more guardian devices to be on the look out for lost device 40. For example, the user of lost device 40 may use another computing device to send an indication to be on the look out for lost device 40 to device recovery server program 110. The mobile operator may then send the indication over network 20 to all other devices with an instance of device recovery program 100B running on them. If device recovery program 100B determines that lost device 40 has been detected then the device recovery program 100B will determine that lost device 40 is lost based on the received indication from device recovery server program 110.

In some embodiments, decision 320 may take place after step 330 depending on the protocol used to electronically bind lost device 40 and guardian device 50. For example, if the devices will be bound by using Bluetooth protocols, the inquiry of whether lost device 40 is lost will have to take place after the devices are connected by the Bluetooth protocol.

If device recovery program 100B determines that determines that none of the one or more detected devices nearby guardian device 50 are lost (decision 320, no branch), device recovery program 100B returns to step 300. If device recovery program 100B determines that at least one of the one or more detected devices nearby guardian device 50 are lost (decision 320, yes branch, device recovery program 100B proceeds to step 330.

In step 330, device recovery program 100B electronically binds guardian device 50 to the one detected device nearby guardian device 50 that is lost (e.g., lost device 40). Device recovery program 100B sends a request for lost device 40 to electronically bind with guardian device 50 over PAN 30. In one embodiment, device recovery program 100B sends a request to "pair" lost device 40 with guardian device 50 to device recovery program 100A of lost device 40 over PAN 30.

In this embodiment, lost device 40 must also be Bluetooth enabled and in "discoverable mode." In another embodiment, if lost device 40 and guardian device 50 are both within range to join the same WPAN (e.g., wireless LAN), device recovery program 100B sends a request to create a peer-to-peer connection to device recovery program 100A of lost device 40. Different embodiments regarding electronically binding lost device 40 with guardian device 50 over PAN 30 are discussed in reference to step 240 above.

In step 340, device recovery program 100B obtains information relating to lost device 40 (e.g., the one detected device nearby guardian device 50 that is lost). In one embodiment, device recovery program 100B sends a request to device recovery program 100A over PAN 30 to retrieve information relating to lost device 40. In another embodiment, device recovery program 100B sends a request to device recovery server program 110 over network 20 to retrieve information relating to lost device 40. The mobile operator may use information previously configured by the user of lost device 40 while accessing device recovery server program 110 on the mobile operator's system to respond to the request and/or the mobile operator may retrieve new information from lost phone 40, itself.

For example, information relating to lost device 40 may include, but is not limited to: the name and contact information of the user of lost device 40 including other contact numbers or email addresses; how long lost device 40 has been lost; where lost device 40 was lost; value of any reward offered for recovery of lost device 40 (this could be preset during the configuration of device recovery program 100A). In order for device recovery program 100A to respond to the request from device recovery program 100B, device recovery program 100A can call various APIs on lost device 40 to obtain the information relating to lost device 40. For example, device recovery program 100A can call contacts API 80A to retrieve the name and contact information of the user of lost device 40 including other contact numbers or email addresses. Device recovery program 100A can call location API 90A to determine where lost device 40 was lost during operation of step 200 described above.

In step 350, device recovery program 100B sends the information relating to the one detected device nearby guardian device 50 that is lost (e.g., lost device 40) to a designated party. In one embodiment, device recovery program 100B queries device recovery program 100A for the designated party. In other embodiments, the designated party is retrieved in step 340. For example, the designated party may be the user of lost device 40 at the users other contact numbers or email addresses. In other examples, the designated party may be another specified friend of the user, the mobile operator, the police, or a third party security system.

In yet another example, a designated party may not have been set by the user during configuration of device recovery program 100A. In such a case, device recovery program 100A may send all or a subset of contacts to device recovery program 100B. Device recovery program 100B, upon receipt of all the contacts or a subset of contacts will compare the contact list on guardian device 50 (accessed through contacts API 80B) with the received contacts for matches. If device recovery program 100B finds any matches it can prioritize who to contact based on this match.

In one embodiment, if the designated party can be reached electronically (e.g., by text message or email), device recovery program 100B sends the information relating to the one detected device nearby guardian device 50 that is lost (e.g., lost device 40) directly to the designated party. In another embodiment, if the designated party can not be reached electronically (e.g., by text message or email), device recovery program 100B alerts the user of guardian device 50 so that the user may contact the designated party.

In other embodiments, if lost device 40 is not lost but the user of lost device 40 has engaged multiple guardian devices to be on the look out for lost device 40; the multiple guardian devices may coordinate a response to a designated party. In one example, the first guardian device to bind to lost device 40 will receive the information relating to lost device 40 from each subsequent guardian device to bind to lost device 40 and obtain information relating to lost device 40. The information relating to lost device 40 obtained from subsequent guardian devices may included more up to date location information that may aid in finding lost device 40. In another example, each guardian device to bind to lost device 40 may send the information relating to lost device 40 to device recovery server program 110 over network 20.

In step 360, device recovery program 100B receives an indication to unbind guardian device 50 from lost device 40. In one embodiment, after lost device 40 is returned to its user, device recovery program 100B receives an indication from the user of guardian device 50 indicating that lost device 40 is no longer lost. The user may use a user interface to device recovery program 100B to indicate that lost device 40 is no longer lost. In another embodiment, device recovery program 100B must also receive an indication from device recovery program 100A indicating that lost device 40 is no longer lost. Device recovery program 100A may determine that lost device 40 is no longer lost as describe in reference to step 250 above. In other embodiments, device recovery program 100B may only have to receive an indication from the user of guardian device 50 that lost device 40 is no longer lost.

In step 370, after receiving the indication to unbind guardian device 50 from lost device 40, device recovery program 100B unbinds guardian device 50 from lost device 40. In one embodiment, if lost device 40 and guardian device 50 are "paired" such that device recovery programs 100A and 100B can communicate using Bluetooth protocols, device recovery program 100B removes lost device 40 as a "paired" device. In another embodiment, if lost device 40 and guardian device 50 are both within range to join the same WPAN (e.g., wireless LAN) such that device recovery programs 100A and 100B can communicate, device recovery program 100B may send an indication, using a wireless network API of guardian device 50, to deactivate the wireless network antenna of guardian device 50 or to disconnect from the available wireless network. After device recovery program 100B completes step 370 it returns to step 300.

FIG. 4 depicts a block diagram of components of lost device 40, guardian device 50, and mobile operator server 60 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Lost device 40, guardian device 50, and mobile operator server 60 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system.

For example, communications fabric 402 can be implemented with one or more buses.

Memory 406 and persistent storage 408 are computer-readable storage media. In one embodiment, memory 406 includes random access memory (RAM) 414 and cache memory 416. In general, memory 406 can include any suitable volatile or non-volatile computer-readable storage media.

Contacts API 80A, location API 90A, and device recovery program 100A are stored in persistent storage 408 of lost device 40 for execution and/or access by one or more of the respective computer processors 404 of lost device 40 via one or more memories of memory 406 of lost device 40. Contacts API 80B, location API 90B, and device recovery program 100B are stored in persistent storage 408 of guardian device 50 for execution and/or access by one or more of the respective computer processors 404 of guardian device 50 via one or more memories of memory 406 of guardian device 50. Device recovery server program 110 is stored in persistent storage 408 of mobile operator server 60 for execution by one or more of the respective computer processors 404 of mobile operator server 60 via one or more memories of memory 406 of mobile operator server 60. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers, data processing systems, or devices. In these examples, communications unit 410 includes one or more network interface cards. Communications unit 410 may provide communications through the use of either or both physical and wireless communications links. Contacts API 80A, location API 90A, and device recovery program 100A may be downloaded to persistent storage 408 of lost device 40 through communications unit 410 of lost device 40. Contacts API 80B, location API 90B, and device recovery program 100B may be downloaded to persistent storage 408 of guardian device 50 through communications unit 410 of guardian device 50. Device recovery server program 110 may be downloaded to persistent storage 408 of mobile operator server 60 through communications unit 410 of mobile operator server 60.

I/O interface(s) 412 allows for input and output of data with other devices that may be connected to computing system 10. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., contacts API 80A, location API 90A, and device recovery program 100A, can be stored on such portable computer-readable storage media and can be loaded onto persistent storage 408 of lost device 40 via I/O interface(s) 412 of lost device 40. Software and data used to practice embodiments of the present invention, e.g., contacts API 80B, location API 90B, and device recovery program 100B, can be stored on such portable computer-readable storage media and can be loaded onto persistent storage 408 of guardian device 50 via I/O interface(s) 412 of guardian device 50. Software and data used to practice embodiments of the present invention, e.g., device recovery server program 110, can be stored on such portable computer-readable storage media and can be loaded onto persistent storage 408 of mobile operator server 60 via I/O interface(s) 412 of mobile operator server 60. I/O interface(s) 412 also connect to a display 420.

Display 420 provides a mechanism to display data to a user and may be, for example, a computer monitor or a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising the steps of:
    a first mobile device detecting a second mobile device in the vicinity of the first mobile device;
    the first mobile device determining that the second mobile device is lost;
    the first mobile device electronically binding to the second mobile device;
    the first mobile device obtaining information relating to the second mobile device;
    the first mobile device sending the information relating to the second mobile device to a designated party;
    the first mobile device receiving an indication that the second device is no longer lost; and
    the first mobile device, in response to receiving the indication that the second device is no longer lost, unbinding from the second mobile device.

2. The method of claim 1, wherein the step of the first mobile device detecting the second mobile device in the vicinity of the first mobile device comprises:
    the first mobile device joining an available personal area network; and
    the first mobile device scanning the available personal area network for any mobile devices also joined to the available personal area network.

3. The method of claim 2, wherein the step of the first mobile device electronically binding to the second mobile device comprises the first mobile device sending a request to the second mobile device to create a peer-to-peer connection between the first mobile device and the second mobile device.

4. The method of claim 1, wherein the step of the first mobile device determining that the second mobile device is lost comprises:
the first mobile device sending a request to the second mobile device to inquire if the second mobile device is lost; and
the first mobile device receiving an indication that the second mobile device is lost from the second mobile device.

5. The method of claim 1, wherein the step of the first mobile device determining that the second mobile device is lost comprises:
the first mobile device sending a request to a mobile operator to inquire if the second mobile device is lost; and
the first mobile device receiving an indication that the second mobile device is lost from the mobile operator.

6. The method of claim 1, wherein the step of the first mobile device sending the information relating to the second mobile device to a designated party comprises the first mobile device sending the information relating to the second mobile device to the designated party and a mobile operator.

7. The method of claim 1, wherein the information relating to the second mobile device includes a designated party to contact and contact information for the designated party.

8. A computer program product comprising:
one or more computer-readable storage devices and program instructions stored on the one or more computer-readable storage devices, the program instructions comprising:
program instructions to detect, by a first mobile device, a second mobile device in the vicinity of the first mobile device;
program instructions to determine, by the first mobile device, that the second mobile device is lost;
program instructions to electronically bind, by the first mobile device, to the second mobile device;
program instructions to obtain, by the first mobile device, information relating to the second mobile device;
program instructions to send, by the first mobile device, the information relating to the second mobile device to a designated party;
program instructions to receive, by the first mobile device, an indication that the second device is no longer lost; and
program instructions to, by a first mobile device, in response to receiving the indication that the second device is no longer lost, unbind from the second mobile device.

9. The computer program product of claim 8, wherein the program instructions to detect, by a first mobile device, a second mobile device in the vicinity of the first mobile device comprise:
program instructions to join, by the first mobile device, an available personal area network; and
program instructions to scan, by the first mobile device, the available personal area network for any mobile devices also joined to the available personal area network.

10. The computer program product of claim 9, wherein the program instructions to electronically bind, by the first mobile device, to the second mobile device comprise program instructions to send, by the first mobile device, a request to the second mobile device to create a peer-to-peer connection between the first mobile device and the second mobile device.

11. The computer program product of claim 8, wherein the program instructions to determine, by the first mobile device, that the second mobile device is lost comprise:
program instructions to send, by the first mobile device, a request to the second mobile device to inquire if the second mobile device is lost; and
program instructions to receive, by the first mobile device, an indication that the second mobile device is lost from the second mobile device.

12. The computer program product of claim 8, wherein the program instructions to determine, by the first mobile device, that the second mobile device is lost comprise:
program instructions to send, by the first mobile device, a request to a mobile operator to inquire if the second mobile device is lost; and
program instructions to receive, by the first mobile device, an indication that the second mobile device is lost from the mobile operator.

13. The computer program product of claim 8, wherein the program instructions to send, by the first mobile device, the information relating to the second mobile device to a designated party comprise program instructions to send, by the first mobile device, the information relating to the second mobile device to the designated party and a mobile operator.

14. The computer program product of claim 8, wherein the information relating to the second mobile device includes a designated party to contact and contact information for the designated party.

15. A computer system comprising:
one or more computer processors, one or more computer-readable storage devices, and program instructions stored on the computer-readable storage devices for execution by at least one of the one or more processors, the program instructions comprising:
program instructions to detect, by a first mobile device, a second mobile device in the vicinity of the first mobile device;
program instructions to determine, by the first mobile device, that the second mobile device is lost;
program instructions to electronically bind, by the first mobile device, to the second mobile device;
program instructions to obtain, by the first mobile device, information relating to the second mobile device;
program instructions to send, by the first mobile device, the information relating to the second mobile device to a designated party;
program instructions to receive, by the first mobile device, an indication that the second device is no longer lost; and
program instructions to, by a first mobile device, in response to receiving the indication that the second device is no longer lost, unbind from the second mobile device.

16. The computer system of claim 15, wherein the program instructions to detect, by a first mobile device, a second mobile device in the vicinity of the first mobile device comprise:
program instructions to join, by the first mobile device, an available personal area network; and
program instructions to scan, by the first mobile device, the available personal area network for any mobile devices also joined to the available personal area network.

17. The computer system of claim 16, wherein the program instructions to electronically bind, by the first mobile device, to the second mobile device comprise program instructions to send, by the first mobile device, a request to the second mobile device to create a peer-to-peer connection between the first mobile device and the second mobile device.

18. The computer system of claim 15, wherein the program instructions to determine, by the first mobile device, that the second mobile device is lost comprise:
- program instructions to send, by the first mobile device, a request to the second mobile device to inquire if the second mobile device is lost; and
- program instructions to receive, by the first mobile device, an indication that the second mobile device is lost from the second mobile device.

19. The computer system of claim 15, wherein the program instructions to determine, by the first mobile device, that the second mobile device is lost comprise:
- program instructions to send, by the first mobile device, a request to a mobile operator to inquire if the second mobile device is lost; and
- program instructions to receive, by the first mobile device, an indication that the second mobile device is lost from the mobile operator.

20. The computer system of claim 15, wherein the program instructions to send, by the first mobile device, the information relating to the second mobile device to a designated party comprise program instructions to send, by the first mobile device, the information relating to the second mobile device to the designated party and a mobile operator.

* * * * *